May 5, 1953 E. G. SHAVER 2,637,154
MOUNTING MEANS FOR COTTON CHOPPERS
Filed June 29, 1951 2 SHEETS—SHEET 1

INVENTOR
EDGAR G. SHAVER,

BY
McMorrow, Berman & Davidson
ATTORNEYS.

May 5, 1953  E. G. SHAVER  2,637,154
MOUNTING MEANS FOR COTTON CHOPPERS
Filed June 29, 1951  2 SHEETS—SHEET 2
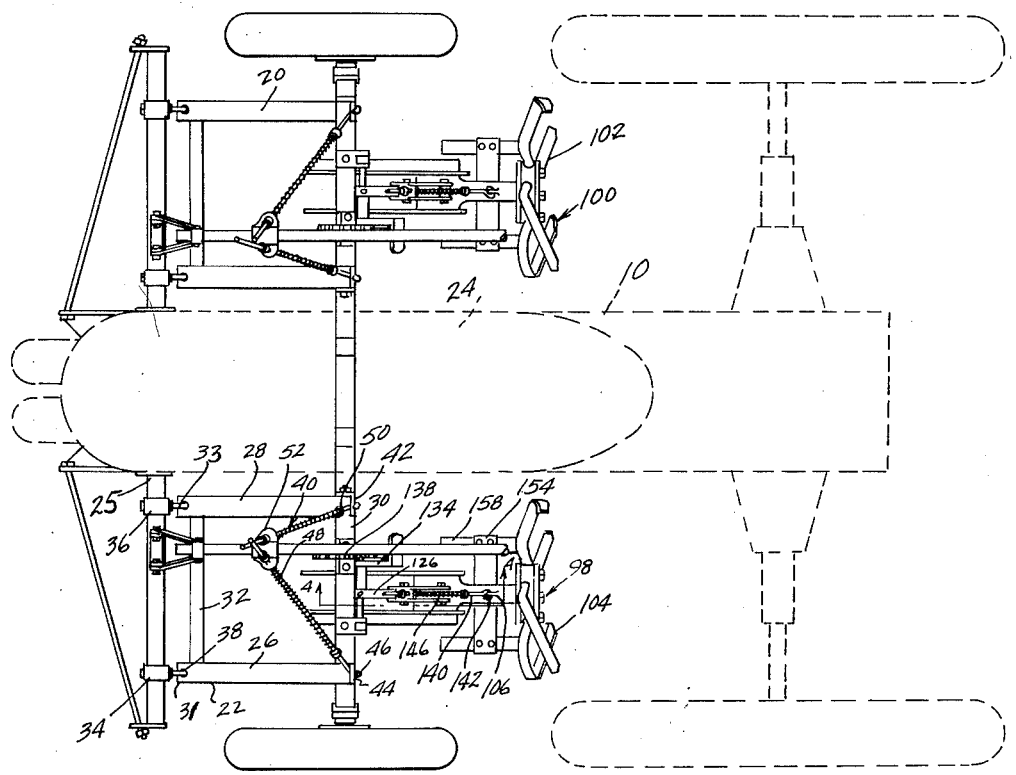
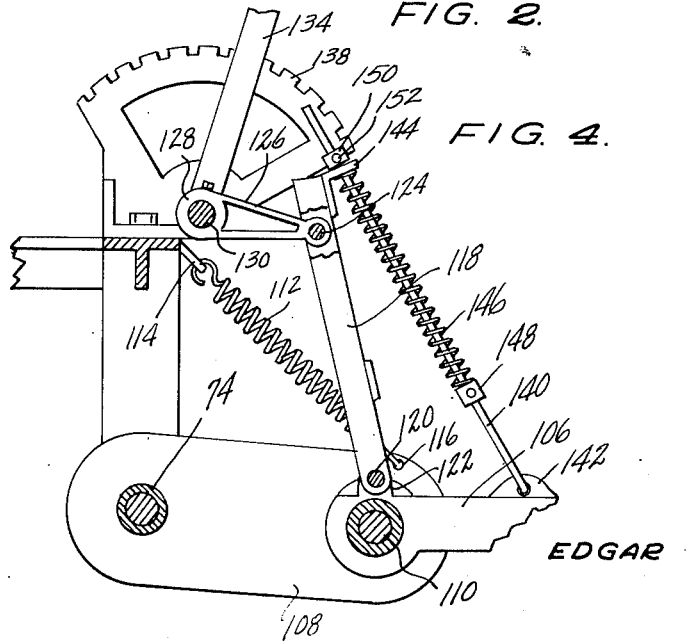
FIG. 2.
FIG. 4.
INVENTOR
EDGAR G. SHAVER.
BY
McMorrow, Berman & Davidson
ATTORNEYS Patented May 5, 1953

2,637,154

UNITED STATES PATENT OFFICE 2,637,154

MOUNTING MEANS FOR COTTON CHOPPERS

Edgar G. Shaver, Marianna, Ark.

Application June 29, 1951, Serial No. 234,185

3 Claims. (Cl. 55—61)

This invention appertains to improvements in mounting means for cotton chopper attachments and has for its primary object to provide means for mounting conventionally constructed and operated cotton choppers on a tractor frame at a point adjacent to and slightly rearwardly of the front wheels of the tractor, so that the choppers are positioned between the front and rear wheels of the tractor and are mounted on the tractor frame in a manner to effectively and completely chop the ends of rows.

Another object of this invention is to provide means for mounting cotton choppers on a tractor in a manner so that the choppers can be easily adjusted for various row heights, the adjustment being conveniently effected by the driver of a tractor from a seated position.

Another object of this invention is to provide a supporting frame for cotton choppers, the frame being easily attached transversely of a tractor and being adjustable about a horizontal axis, so that the frame is vertically swingable to raise and lower the choppers and the choppers being carried by the frame in an adjustable manner, the choppers being vertically adjustable for various row depths.

These and ancillary objects and structural features of merit are attained by this invention, the preferred embodiment of which is set forth in the following description and illustrated in the accompanying drawings, wherein:

Figure 2 is a top plan view thereof;

Figure 4 is a detail fragmentary sectional view taken on line 4—4 of Figure 2.

Figure 1:
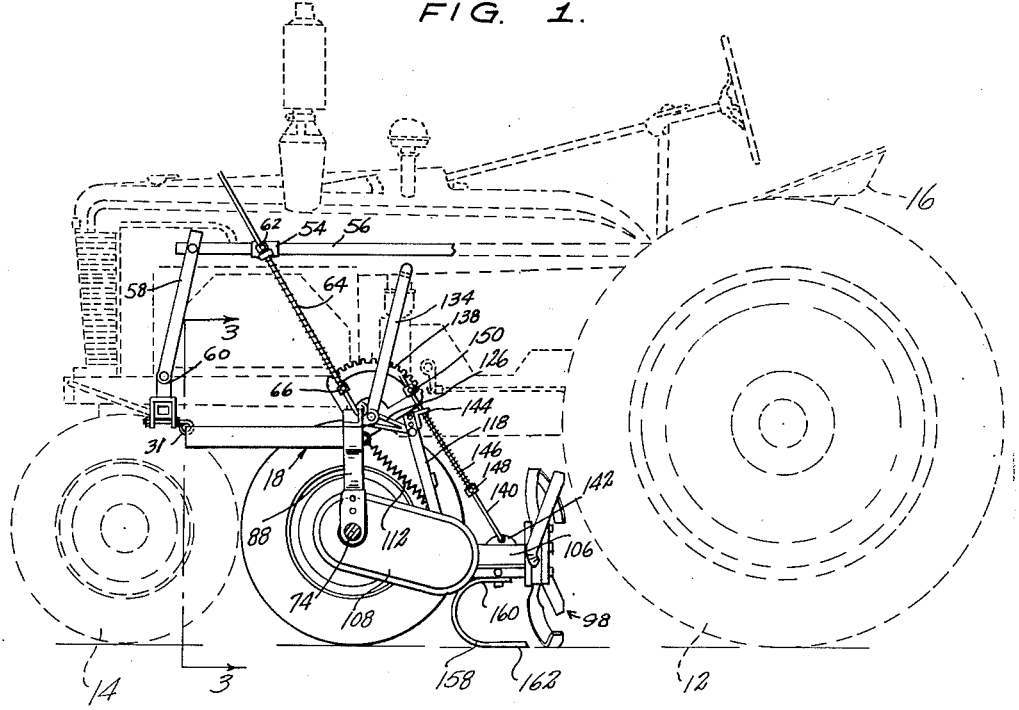
Figure 1 is a side elevational view of a conventional tractor, illustrating conventionally constructed cotton choppers mounted thereon in a manner in accordance with this invention.
Figure 3:
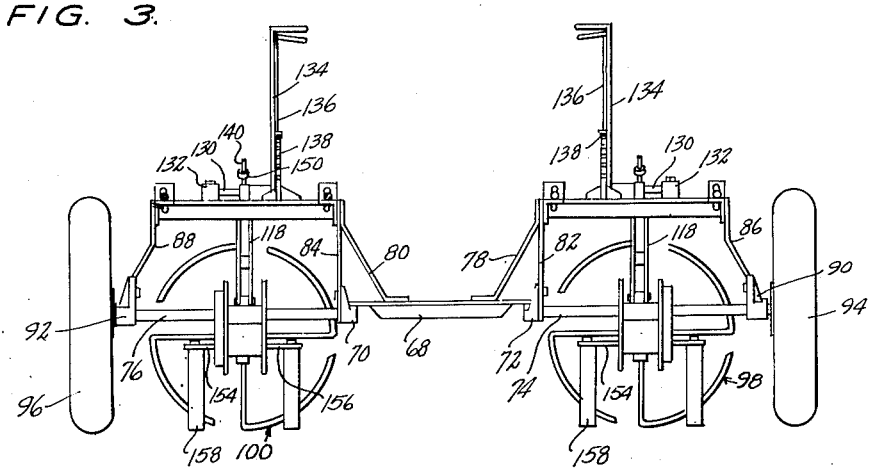
Figure 3 is a transverse sectional view taken on line 3—3 of Figure 1.

With continued reference to the accompanying drawings, a conventional tractor 10 is illustrated for exemplary purposes, the tractor being formed with rear wheels 12 and front steering wheels 14.

Conventionally, cotton choppers are arranged rearwardly of the rear wheels of the tractor and are rotated about a horizontal axis, so that the vertically arranged choppers rotate behind the path of the tractor and engage the rows, as the tractor is moved through a field. However, it is not possible to chop the ends of the rows, since the choppers are disposed rearwardly of the rear wheels of the tractor. Furthermore, in conventional constructions, the depth of the choppers is not easily regulated by a driver from his position on the tractor seat 16.

Accordingly, it is the aim of this invention to provide a mounting means 18, which is especially designed for attachment transversely of the tractor, intermediate the front and rear wheels, so as to support the choppers in a position intermediate the front and rear wheels and to support the choppers for adjustment, which adjustment can be easily effected by a driver from his position on the seat 16.

The mounting means 18 includes a pair of open frames 20 and 22, which are disposed on opposite sides of the tractor frame 24 and are adapted to be pivotally mounted on the tool bar 25 of the tractor, which extends transversely of the tractor frame. The supporting frames are similarly constructed and, with respect to Figure 2, the frame 22, includes opposing sides 26 and 28, the side bars being connected at their adjacent rearward ends by an end bar 30 and at their forward ends by a front cross bar 32, which is spaced inwardly from the forward terminals of the side bars. Eye bolts 31 and 33 are fixedly mounted by clamps 34 and 36 to the tool bar, so that the eyes project rearwardly subadjacent the tool bar 25 and are extended through and hingedly connected to vertical openings 38 formed in the extending ends of the side bars 26 and 28 of the frame. By virtue of the eye bolts 31 and 33, the clamps 34 and 36, and hinged connection of the eye bolts to the openings 38 in the side bars 26 and 28, the mounting means is connected to the tool bar 25 for vertical movement. The movement of the frames 20 and 22 is effected by a suspending shock absorbing structure 40. The suspending structure 40 includes a pair of upstanding apertured ears 42 and 44 formed on the rearward ends of the side bars 26 and 28 and receiving the hook ends 46 of a pair of rods 48 and 50. The rods 48 and 50 converge upwardly and are slidably disposed through an apertured mounting plate 52, which is carried by a sleeve 54. The sleeve is provided with fastening means for fastening the sleeve in adjusted position on the adjusting bar 56, which is pivoted to a rod 58, the rod 58 extending upwardly from a bracket 60 formed on the tool bar in a conventional manner.

Each of the rods 48 and 50 is formed with an axially adjustable collar 62, which is fixedly circumposed on the rod and secured thereto by a set screw and a spring 64 is concentrically coiled on each rod, intermediate the plate 52 and an adjustable stop 66, which is circumposed on the rod above the hooked ends thereof, so as to adjust the tension of the springs 64 on each rod.

A cross bar 68 extends transversely beneath the tractor frame and has its opposing ends suitably affixed to a pair of upstanding bearing blocks 70 and 72, which support the inner ends of axles 74 and 76. Divergent brace bars 78 and 80 are mounted at their lower ends on the cross bar and have their upper ends suitably fastened to upstanding supporting arms 82 and 84, which are fastened to the inner side bars of each of the frames 20 and 22. The arms 82 and 84 are bolted or otherwise fixedly secured to the bearing blocks at their lower ends and companion brace arms 86 and 88 are secured to the outer side bars of each of the frames and depend therefrom, the lower ends of the brace bars 86 and 88 being offset and supporting bearing blocks 90 and 92, which rotatably receive the outer ends of the axles 74 and 76. Ground engaging wheels 94 and 96 are suitably mounted on the extending or outer ends of the axles, the wheels being substantially in longitudinal alignment with the rear wheels 12 of the tractor. Thus, the frames 20 and 22 are mounted on the axles 74 and 76 and secured thereto by the suitable brace means.

Cotton chopper units 98 and 100 of conventional construction are carried by the axles 74 and 76 and are adjustably suspended from the supporting frames 20 and 22. The chopper assemblies include blade units 102 and 104, which are disposed transversely of and carried by housings 106, which are journaled on the axles by casings 108, the casings containing drive mechanisms of conventional construction, for rotating the shafts within the housings 106 to effect rotary motion of the blades. The housings 106 are journaled on shafts 110, which are transversely disposed in the casings and a spring 112 is carried by an ear 114 on each frame and is anchored at its lower end in an opening 116 in the casings. A lift arm 118 is pivoted by a pivot pin 120 to an upstanding ear 122 on the inner end of the housing 106 and is pivotally secured by a pivot pin 124 to projecting arm 126. The arm 126 terminates in a collar 128, which is fixedly circumposed on a rod 130, the rod being rotatably journaled in suitable bearing blocks 132, which are formed on the end bar 30 of each frame. Upstanding hand levers 134 are secured to the rods 130 and are provided with pawls 136, engageable in quadrants 138, the quadrants being fixed on the frames. A tie rod 140 is provided with a lower hooked end, which is fixed to an upstanding ear 142 formed on the housing 106 and is slidably disposed through an apertured ear 144, which projects rearwardly from the upper end of the lift arm 118. A spring 146 is concentrically coiled on the rod 140 and is seated at its lower end on an adjustable abutment 148 and engages the under side of the ear 144 at its upper end. An adjustable collar 150 is adjustably circumposed on the rod, above the ear 144 and is provided with a set screw 152 for fastening it in adjusted position.

Lateral arms 154 and 156 project from the housings 106 and C-shaped runners 158 have their upper legs 160 secured by suitable fastening means to the arms, so that the lower legs 162 thereof are disposed in ground engaging position, the runners being provided to retain the blades in proper ground engagement.

In use, it can be seen that the frames 20 and 22 are adjustable by means of the arms 56, the frames pivoting about the eye bolts, so that the rearward ends thereof can be raised and lowered. Supplemental thereto, the housings 106 for the shafts of the blade units can be raised and lowered about the axles 74 and 76 as an axis, the housings swinging about the shafts 110 and the housings being adjusted by means of the lift arms 118, which raise the housings and which are lockable in adjusted position by means of the pawl and quadrant.

The rods 140 provide a shock absorbing means, since the housings 106 are swingable about the shafts 110 due to a pivotal fit in the arm 118 for the pin 120. Thus, when the housings are locked in selected position by the pawl and quadrant, the spring 146 provides a yielding holding force to hold the housings in their adjusted position but, in the event the runners 162 strike an obstruction in the ground, the housings can raise, against the urging of the springs 146, to prevent injury to the blades or cutters.

Having thus described the invention, what is claimed is:

1. In combination, a tractor having a chassis including a forward transverse tool bar and front and rear ground engaging wheels, horizontal supporting frames positioned laterally outwardly of the opposite sides of the tractor chassis and between the front and rear wheels of the tractor, said supporting frames having front and rear ends, means pivoting the front ends of said frames to said tool bar, first adjusting means mounted on the tool bar and yieldably connected to the rear end of a supporting frame for adjusting the horizontal angle of the frame to the ground and relative to the tractor chassis frame, arms depending from the rear end of a frame, an axle journalled on lower portions of said arms, a ground engaging wheel mounted on the outer end of the axle, a chopper journalled on said axle intermediate its ends, said chopper including a housing extending rearwardly from the axle, a rotary cutter on the rear end of the housing, said cutter rotating on an axis substantially parallel to the adjacent side of the tractor chassis, and second adjusting means mounted on the rear of said frame and operatively connected to said cutter housing for adjusting the horizontal angle of the cutter axis to the ground and relative to the tractor chassis.

2. In combination, a tractor having a chassis including a forward transverse tool bar and front and rear ground engaging wheels, horizontal supporting frames positioned laterally outwardly of the opposite sides of the tractor chassis and between the front and rear wheels of the tractor, said supporting frames having front and rear ends, means pivoting the front ends of said frames to said tool bar, first adjusting means mounted on the tool bar and yieldably connected to the rear end of a supporting frame for adjusting the horizontal angle of the frame to the ground and relative to the tractor chassis frame, and arms depending from the rear end of a frame, an axle journalled on lower portions of said arms, a ground engaging wheel mounted on the outer end of the axle, a chopper journalled on said axle intermediate its ends, said chopper including a housing extending rearwardly from the axle, a rotary cutter on the rear end of the housing, said cutter rotating on an axis substantially parallel to the adjacent side of the tractor chassis, and second adjusting means mounted on the rear of said frame and operatively connected to said cutter housing for adjusting the horizontal angle of the cutter axis to the ground and relative to the tractor chassis said chopper housing including a member pivoted on the rear end of the housing and carrying said rotary cutter, and yieldable suspension means extending between the rear end of the frame and the rear end of said housing, said second adjusting means being directly connected to said member.

3. In combination, a tractor having a chassis including a forward transverse tool bar and front and rear ground engaging wheels, horizontal supporting frames positioned laterally outwardly of the opposite sides of the tractor chassis and between the front and rear wheels of the tractor, said supporting frames having front and rear ends, means pivoting the front ends of said frames to said tool bar, first adjusting means mounted on the tool bar and yieldably connected to the rear end of a supporting frame for adjusting the horizontal angle of the frame to the ground and relative to the tractor chassis frame, arms depending from the rear end of a frame, an axle journalled on lower portions of said arms, a ground engaging wheel mounted on the outer end of the axle, a chopper journalled on said axle intermediate its ends, said chopper including a housing extending rearwardly from the axle, a rotary cutter on the rear end of the housing, said cutter rotating on an axis substantially parallel to the adjacent side of the tractor chassis, and second adjusting means mounted on the rear of said frame and operatively connected to said cutter housing for adjusting the horizontal angle of the cutter axis to the ground and relative to the tractor chassis the supporting frames having means extending therebetween beneath the tractor chassis and rigidly connecting the frames for movement together.

EDGAR G. SHAVER.

References Cited in the file of this patent

UNITED STATES PATENTS

| Number | Name | Date |
|---|---|---|
| 1,235,843 | Rush | Aug. 7, 1917 |
| 2,340,919 | Allen | Feb. 8, 1944 |
| 2,488,735 | Orendorff | Nov. 22, 1949 |
| 2,492,962 | Bohmker et al. | Jan. 3, 1950 |
| 2,515,660 | Nichols | July 18, 1950 |
| 2,516,794 | Neel | July 25, 1950 |